United States Patent
Chang et al.

(10) Patent No.: US 7,330,487 B2
(45) Date of Patent: Feb. 12, 2008

(54) MULTIPLE SERVICE METHOD AND APPARATUS IN A DATA ONLY MOBILE TELECOMMUNICATION SYSTEM

(75) Inventors: Hong-Sung Chang, Suwon-shi (KR); Tae-Won Kim, Anyang-shi (KR); Jin-Sung Cho, Suwon-shi (KR); Tae-Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 10/621,395

(22) Filed: Jul. 18, 2003

(65) Prior Publication Data
US 2004/0028081 A1 Feb. 12, 2004

(30) Foreign Application Priority Data
Jul. 19, 2002 (KR) ...................... 10-2002-0042562

(51) Int. Cl.
*H04Q 7/00* (2006.01)
*H04Q 7/24* (2006.01)
*H04J 1/24* (2006.01)
*H04J 1/00* (2006.01)
*H04L 12/66* (2006.01)
*H04L 12/56* (2006.01)

(52) U.S. Cl. ...................... 370/490; 370/352; 370/328; 370/338; 370/392; 370/349

(58) Field of Classification Search ........ 370/465–469, 370/490, 498, 355–356, 328–329, 310, 338–349, 370/352, 395.52, 395.64, 218, 299, 253–254, 370/389, 463, 392–393, 471–476, 395.5, 370/473–474, 902, 912; 455/403, 466, 410–411, 455/422.1, 450–451, 516–517, 550.1, 556.1, 455/556.2, 560–561, 557–558; 709/227–229, 709/203
See application file for complete search history.

(56) References Cited

U.S. PATENT DOCUMENTS

| | | | |
|---|---|---|---|
| 6,330,586 B1* | 12/2001 | Yates et al. .................. 709/201 |
| 6,668,175 B1* | 12/2003 | Almgren et al. ............ 455/522 |
| 6,944,150 B1* | 9/2005 | McConnell et al. ........ 370/352 |
| 7,106,706 B1* | 9/2006 | Chaturvedi et al. ......... 370/329 |
| 7,137,006 B1* | 11/2006 | Grandcolas et al. ........ 713/180 |
| 2002/0091788 A1* | 7/2002 | Chlan et al. ................ 709/213 |
| 2003/0060210 A1* | 3/2003 | Ravishankar et al. ....... 455/452 |
| 2003/0208601 A1* | 11/2003 | Campbell et al. ........... 709/227 |
| 2003/0235168 A1* | 12/2003 | Sharma et al. .............. 370/338 |
| 2004/0047366 A1* | 3/2004 | Chowdhury ................ 370/466 |
| 2004/0240427 A1* | 12/2004 | Kohli et al. ................ 370/351 |
| 2005/0232222 A1* | 10/2005 | McConnel et al. ......... 370/349 |

* cited by examiner

*Primary Examiner*—Meless Zewdu
(74) *Attorney, Agent, or Firm*—Roylance, Abrams, Berdo & Goodman, L.L.P.

(57) ABSTRACT

A method and apparatus for supporting a variety of service types in a CDMA2000 1xEV-DO mobile telecommunication system for high-speed data service in a radio communication environment. To receive multiple services according to a plurality of service types, an AT establishes a connection for the data service with a PDSN and configures a session for setting the plurality of service types having different traffic characteristics by the connection. The AT generates a plurality of service instances for the different service types according to the session configuration. It then exchanges data streams with the PDSN in a service instance corresponding to a currently provided service among the plurality of service instances.

28 Claims, 12 Drawing Sheets

FIG.1

| ID VALUE | MEANING |
|---|---|
| 0x0000 | DEFAULT SIGNALING APPLICATION |
| 0x0001 | DEFAULT PACKET APPLICATION BOUND TO THE RADIO ACCESS NETWORK |
| 0x0002 | DEFAULT PACKET APPLICATION BOUND TO THE SERVICE ACCESS NETWORK |
| 0x0003 | TAS (TEST APPLICATION SPECIFICATION) |
| 0xFFFF | STREAM NOT USED |
| ALL OTHER VALUES | RESERVED |

| FIELD | LENGTH(BITS) | DESCRIPTION |
|---|---|---|
| MESSAGE ID | 8 | THE SENDER SHALL SET THIS FIELD TO 0x50. |
| TRANSACTION ID | 8 | THE SENDER SHALL INCREMENT THIS VALUE FOR EACH NEW CONFIGURATION REQUEST MESSAGE SENT. |

ZERO OR MORE INSTANCES OF THE FOLLOWING RECORD

| FIELD | LENGHT(BITS) | DESCRIPTION |
|---|---|---|
| LENGTH(BIT) | 8 | LENGTH OF THIS RECORD IN OCTETS. |
| ATTRIBUTE ID | 8 | THE SENDER SHALL SET THIS FIELD TO 0x00. |

ONE OR MORE THE FOLLOWING RECORD

| VALUE ID | 8 | THE SENDER SHALL SET THIS FIELD TO AN IDENTIFIER TO THIS COMPLEX VALUE. |
|---|---|---|
| STREAM 0 APPLICATION | 16 | THE SENDER SHALL SET THIS FIELD TO THE SUBTYPE OF THE APPLICATION USED OVER STREAM 0. |
| STREAM 1 APPLICATION | 16 | THE SENDER SHALL SET THIS FIELD TO THE SUBTYPE OF THE APPLICATION USED OVER STREAM 1. |
| STREAM 2 APPLICATION | 16 | THE SENDER SHALL SET THIS FIELD TO THE SUBTYPE OF THE APPLICATION USED OVER STREAM 2. |
| STREAM 3 APPLICATION | 16 | THE SENDER SHALL SET THIS FIELD TO THE SUBTYPE OF THE APPLICATION USED OVER STREAM 3. |

FIG.7

| FIELD | LENGTH(BITS) | DESCRIPTION |
|---|---|---|
| MESSAGE ID | 8 | THE SENDER SHALL SET THIS FIELD TO 0x51. |
| TRANSACTION ID | 8 | THE SENDER SHALL INCREMENT THIS VALUE TO THE TRANSACT ID FIELD OF THE CORRESPONDING CONFIGURATION REQUEST MESSAGE. |

ZERO OR MORE INSTANCES OF THE FOLLOWING RECORD

| | | |
|---|---|---|
| ATTRIBUTE RECORD | ATTRIBUTE DEPENDENT | AN ATTRIBUTE RECORD CONTAINING A SINGLE ATTRIBUTE. IF THIS MESSAGE SELECTS A COMPLEX ATTRIBUTE, ONLY THE VALUE ID FIELD OF THE COMPLEX ATTRIBUTE SHALL BE INCLUDED IN THE MESSAGE. |

FIG.8

| ID VALUE | MEANING |
|---|---|
| 0x0000 | DEFAULT SIGNALING APPLICATION |
| 0x0001 | DEFAULT PACKET APPLICATION BOUND TO THE RADIO ACCESS NETWORK |
| 0x0002 | DEFAULT PACKET APPLICATION BOUND TO THE SERVICE ACCESS NETWORK |
| 0x0003 | TAS(TEST APPLICATION SPECIFICATION) |
| 0x0004 | DEFAULT PACKET APPLICATION BOUND TO THE SERVICE ACCESS NETWORK WITH SI-TYPE_2 |
| 0x0005 | DEFAULT PACKET APPLICATION BOUND TO THE SERVICE ACCESS NETWORK WITH SI-TYPE_3 |
| 0xFFFF | STREAM NOT USED |
| ALL OTHER VALUES | RESERVED |

FIG.9

| FIELD | LENGTH(BITS) | DESCRIPTION |
|---|---|---|
| MESSAGE ID | 8 | AT SHALL SET THIS FIELD TO ANY UNUSED VALUE. |
| TRANSACTION ID | 8 | AT SHALL INCREMENT THIS VALUE FOR EACH NEW ENHANCED CONNECTION REQUEST MESSAGE SENT. |
| STREAM TYPE | 2 | THIS MEANS STREAM TYPE OF SERVICE INSTANCE TO BE ADDED AND HAS ONE OF STREAM IDS SET BY SESSION CONFIGURATIONS |
| RESERVED | 6 | |

FIG.10

| FIELD | LENGTH(BITS) | DESCRIPTION |
|---|---|---|
| MESSAGE ID | 8 | AT SHALL SET THIS FIELD TO ANY UNUSED VALUE. |
| TRANSACTION ID | 8 | AT SHALL VALUE TO THE TRANSACTION ID FIELD OF THE CORRESPONDING ENHANCED CONNECTION REQUEST MESSAGE. |
| RESULT | 1 | "0" MEANS SUCCESS AND "1" MEANS FAILURE. |
| RESERVED | 7 | |

| FIELD | LENGTH(BITS) | DESCRIPTION |
|---|---|---|
| MESSAGE ID | 8 | AT SHALL SET THIS FIELD TO ANY UNUSED VALUE. |
| CLOSE REASON | 3 | REASON OF CONNECTION CLOSE |
| STREAM TYPE | 2 | THIS MEANS STREAM TYPE OF SERVICE INSTANCE TO BE TERMINATED AND HAS ONE OF STREAM IDS SET BY SESSION CONFIGURATIONS |
| RESERVED | 3 | |

FIG.14

| FIELD | DESCRIPTION |
|---|---|
| '000' | NORMAL CLOSE |
| '001' | CLOSE REPLY |
| '010' | CONNECTION ERROR |
| OTHER VALUES | RESERVED |

MULTIPLE SERVICE METHOD AND APPARATUS IN A DATA ONLY MOBILE TELECOMMUNICATION SYSTEM

PRIORITY

This application claims priority under 35 U.S.C. § 119 to an application entitled "Multiple Service Method in a Data Only Mobile Telecommunication System" filed in the Korean Intellectual Property Office on Jul. 19, 2002 and assigned Serial No. 2002-42562, the contents of which are herein incorporated by reference.

BACKGROUND OF THE INVENTION

1. Field of the Invention

The present invention relates generally to a mobile telecommunication system, and in particular, to a method of providing a high-speed packet data service according to various traffic characteristics.

2. Description of the Related Art

A Code Division Multiple Access (CDMA) 1x system has evolved from a typical $2^{nd}$ generation (2G) CDMA system. It offers wireless data service at up to 144 Kbps, 129.6 Kbps faster than the 14.4 Kbps provided by the 2G CDMA system. In addition, voice service is also provided. A CDMA2000 Evolution-Data Only (1xEV-DO) system was proposed as a complementary solution for high-speed data transmission at the level of International Mobile Telecommunications (IMT)-2000. The CDMA2000 1xEV-DO system assigns overall system resources only to a data service, thus making high-speed data transmission at the Mbps level possible. This system supports packet-based communication rather than circuit-based communication.

Figure 1:
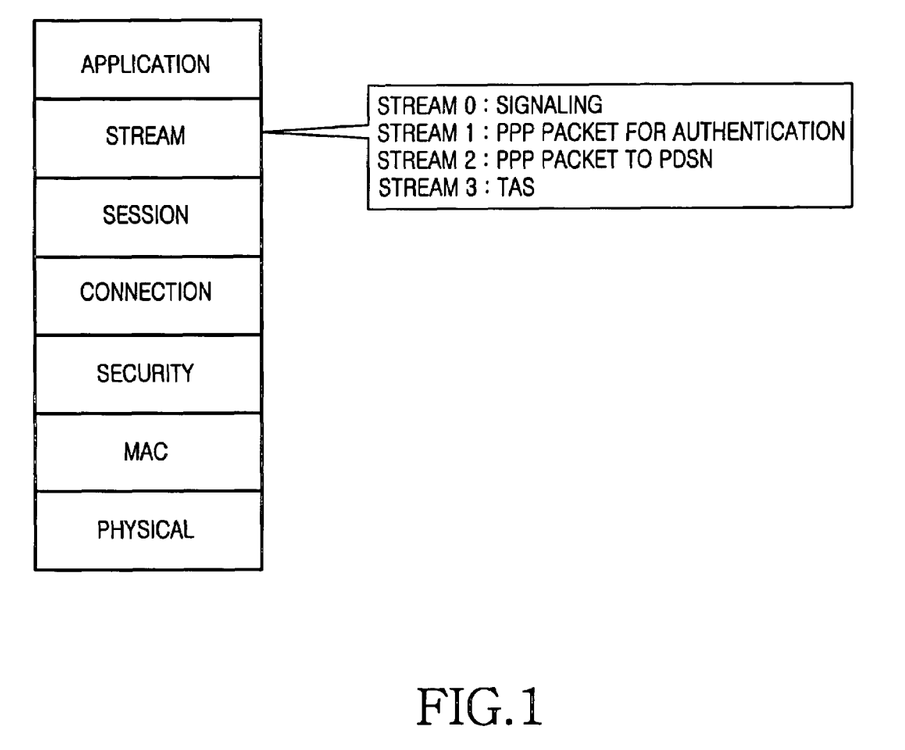
FIG. 1 is a block diagram illustrating an example of a 7-layer protocol stack in a conventional CDMA2000 1xEV-DO system.

FIG. 1 is a block diagram illustrating an example of a 7-layer protocol stack for wireless communication in a conventional CDMA2000 1xEV-DO system. As illustrated, the protocol stack comprises an application layer, a stream layer, a session layer, a connection layer, a security layer, a Media access Control (MAC) layer, and a physical layer.

Figure 2:
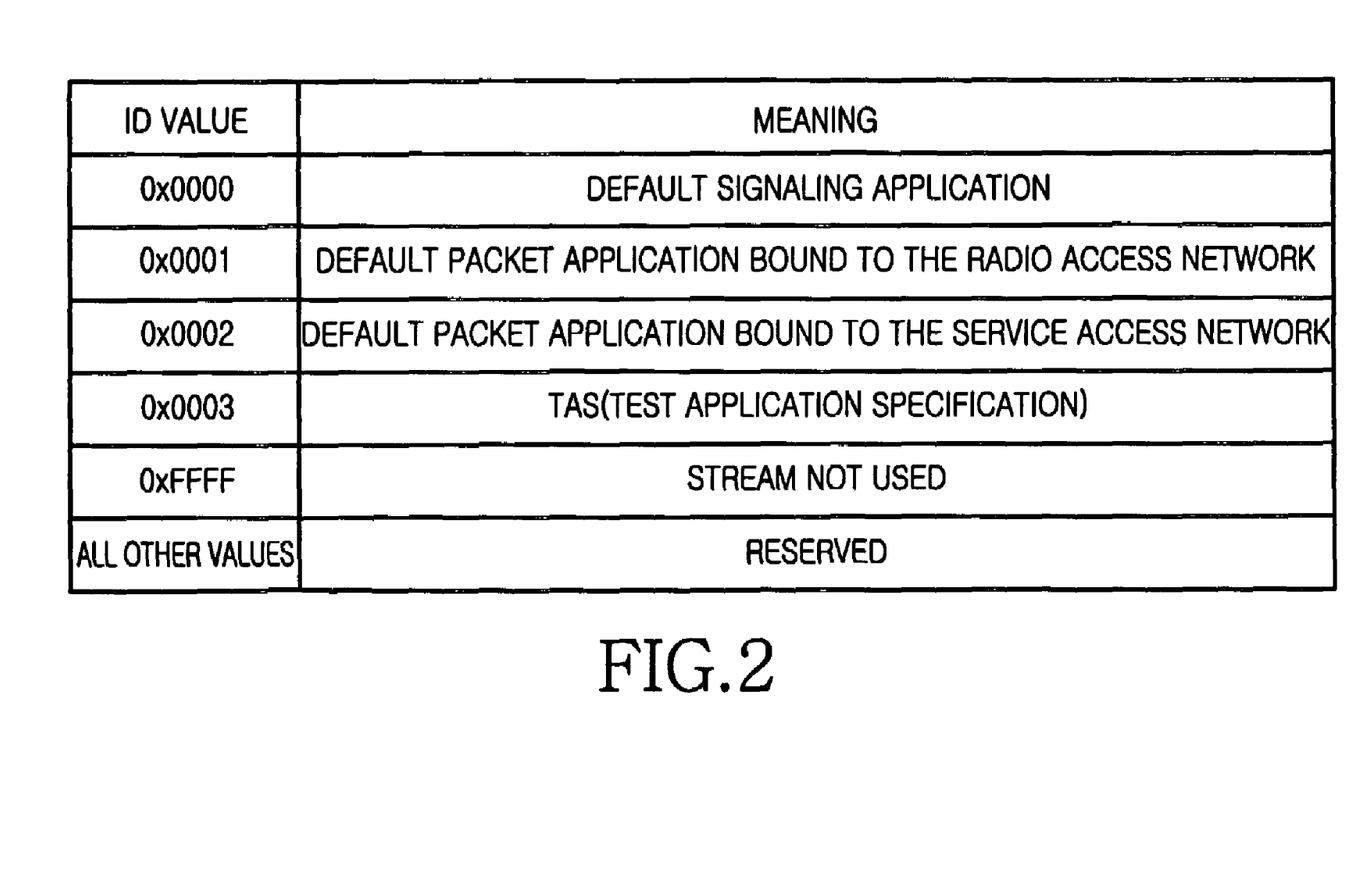
FIG. 2 is a block diagram illustrating an example of application services identified by stream headers in the CDMA2000 1xEV-DO system.

The application layer processes actual data in an available form for users and uses the stream layer to transmit/receive the data streams. The stream layer generates and analyzes a stream header according to a service type supported by the application layer. An example of service types identified by stream headers is illustrated in FIG. 2. Referring to FIG. 2, four data stream types are distinguished by 2-bit values of the stream header.

More specifically, '0x0000 (default signaling application)' indicates signaling data between an Access Terminal (AT) and an Access Network (AN), '0x0001 (default packet application bound to the radio access network)' indicates data used for AT authentication in a radio access network (RAN), '0x0002 (default packet application bound to the service access network)' indicates actual data bound to a packet data network (e.g., Internet), and '0x0003 (TAS: Test Application Specification)' indicates data defined for checking a system function.

As illustrated in FIG. 2, actual data is considered to be one type (0x002) in the stream layer. Considering that the application layer is capable of processing a variety of service packets, for example, File Transfer Protocol (FTP) packets, Voice over Internet Protocol (VoIP) packets, and video stream packets, servicing those different packets with the same traffic characteristics is inefficient. For example, VoIP packets and video stream packets are very sensitive to delay, and FTP packets are more sensitive to errors than to delay.

Despite these different traffic characteristics, the stream layer handles the packets indiscriminately. Therefore, the user demand for discriminate services cannot be satisfied.

As described above, the CDMA2000 1xEV-DO system classifies all user data as one type and makes no distinction between the traffic characteristics of different packets including FTP, VoIP, and video stream packets, when servicing different packets. Therefore, there is a need for a method of providing various services for one call connection.

SUMMARY OF THE INVENTION

It is, therefore, an object of the present invention to provide a method and apparatus for providing various types of services according to the traffic characteristics of data transmitted from an AT in a data only mobile telecommunication system.

It is another object of the present invention to provide a method and apparatus for providing multiple services according to various traffic characteristics for one call connection in a data only mobile telecommunication system.

It is a further object of the present invention to provide, generate and terminate a plurality of service instances for one call connection according to traffic characteristics in a data only mobile telecommunication system.

It is still another object of the present invention to provide a method and apparatus of describing the traffic characteristics of various service types for a plurality of service instances in a data only mobile telecommunication system.

The above objects are substantially accomplished by a method and apparatus of providing multiple services according to a plurality of service types in a data only mobile telecommunication system having an AN for communicating with an AT on a radio channel and a PDSN for providing a data service to the AT via the AN.

According to one embodiment of the present invention, to receive multiple services according to a plurality of service types, the AT establishes a connection for the data service with the PDSN and configures a session for setting the plurality of service types having different traffic characteristics by the connection. The AT generates a plurality of service instances for the different service types according to the session configuration. It then exchanges data streams with the PDSN in a service instance corresponding to a currently provided service among the plurality of service instances.

According to another embodiment of the present invention, a first session is configured for AT authentication between the AT and the AN. The AT is authenticated according to the first session, and a connection for the data service is established between the AT and the PDSN. A second session is configured by the connection, for defining a plurality of service types having different traffic characteristics. The plurality of service instances set to different service types are generated according to the second session and data streams are exchanged between the AT and the PDSN in a service instance corresponding to a currently provided service among the plurality of service instances.

According to a further embodiment of the present invention, data are transmitted between the AT and the PDSN in traffic paths established for a plurality of service instances set to a plurality of service types by a connection for the data service. The AT transmits to the PDSN via the AN a connection close message with the service type of a service instance to be terminated, upon request for termination of the service instance. Upon receipt of a connection close response message from the PDSN via the AN, the AT terminates the service instance.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Embodiments of the present invention will be described herein below with reference to the accompanying drawings. In the following description, well-known functions or constructions are omitted for conciseness.

In accordance with the present invention, a plurality of service instances are generated and terminated to provide multiple services according to traffic characteristics in a data only mobile telecommunication system. A description will be made below of distinguishing data by their traffic characteristics in the context of a CDMA2000 1xEV-DO system. Yet, the multiple service method of the present invention is applicable to other mobile telecommunication systems having similar technical backgrounds and channel configurations with some modifications made, which is obvious to those skilled in the art.

First, a method of identifying a service type by introducing the concept of service option (SO) in an IS-2000 CDMA2000 1x system will be described. In the CDMA2000 1x system, a plurality of service instances supporting different service types can be produced using different SO numbers for one call. The service instances describe various traffic characteristics and store/manage service parameters corresponding to their service types.

Figure 3:
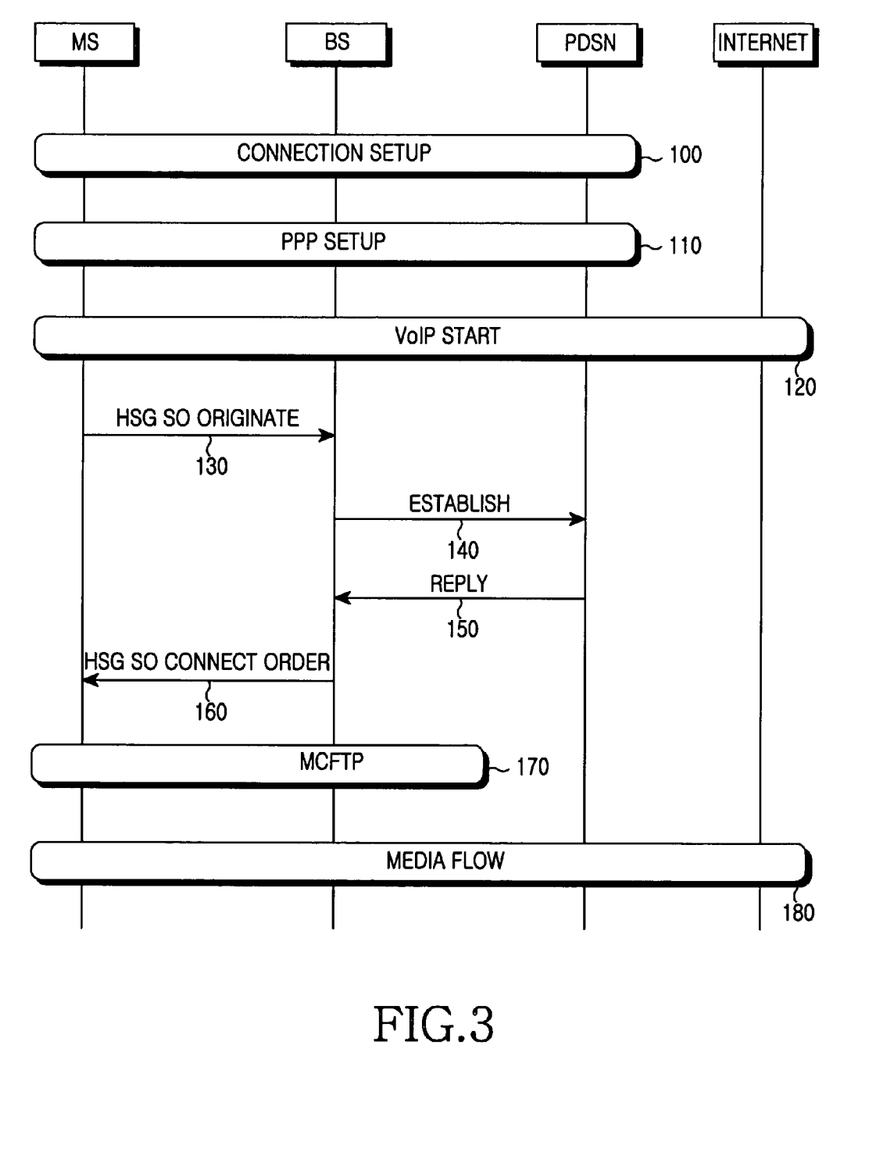
FIG. 3 is diagram illustrating an example of a call process for VoIP service in a CDMA2000 1x system.

FIG. 3 is a diagram illustrating an example of a call flow for providing multiple services in a CDMA2000 1x system. This call flow is related especially to SO number 60 which is conventionally used to represent VoIP service. A Mobile Station (MS) is connected to a Packet Data Service Node (PDSN) through a base station (BS) and the PDSN delivers data received from the MS to the Internet.

Figure 4:
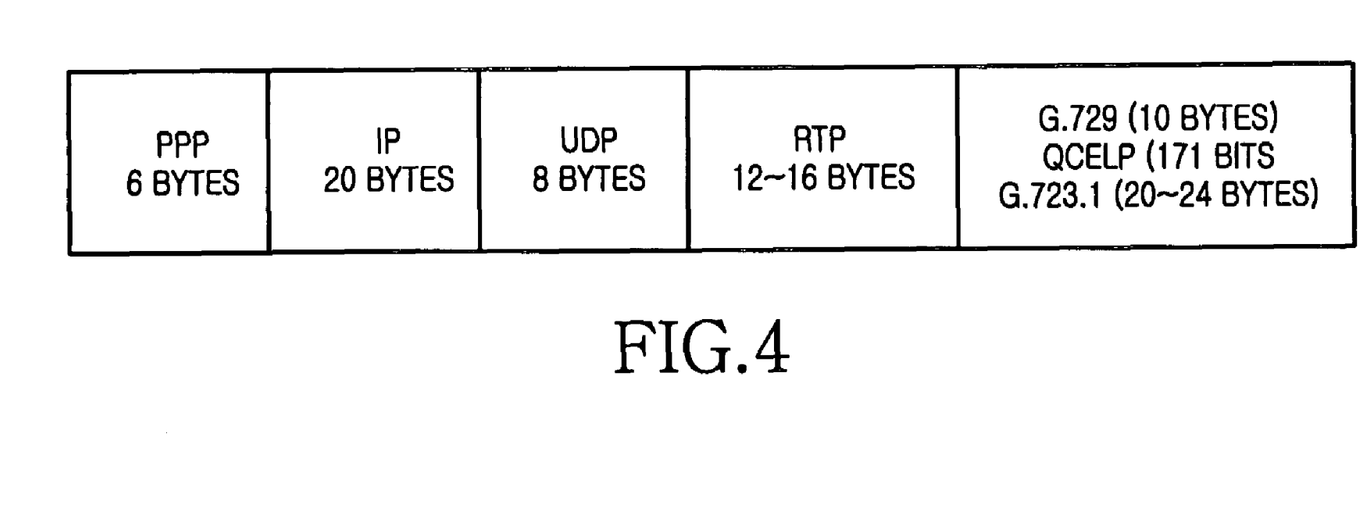
FIG. 4 is a block diagram illustrating an example of a format of a conventional VoIP packet.

The structure of a typical VoIP packet is illustrated in FIG. 4. Referring to FIG. 4, the VoIP packet has a payload attached with a Point to Point Protocol (PPP)/Internet Protocol (IP)/User Datagram Protocol (UDP)/Real Time Transfer Protocol (RTP) header. The header size is 46 bytes. It is impossible to deliver this VoIP packet on a fundamental channel (FC) of 171 bits. Thus, the CDMA2000 1x system performs a header stripping and generation (HSG) procedure on the VoIP packet using a service instance corresponding to SO number 60.

Referring to FIG. 3, the MS assigns radio resources for a packet data service with the PDSN according to SO 33 for high-speed data transmission and sets up a call in step 100. During this process, radio channels are established between the MS and the BS, a traffic path is established between the MS and the PDSN via the BS, and a service instance is generated to process the traffic path between the MS and the BS. In step 110, the PDSN authenticates the MS and establishes a PPP connection for Internet access through the traffic path.

In step 120, the MS receives a message for initiation of the VoIP service from a VoIP server (not shown) over the Internet by the PPP connection, or transmits a message for initiation of the VoIP service to the VoIP server. Thus, the VoIP service starts. The VoIP service initiation messages are transmitted in the traffic paths established by SO 33 according to End to End (E2E) Session Initialization Protocol (SIP).

The MS additionally generates a service instance related to the VoIP service and transmits an Enhanced Origination message with SO 60 set in step 130. That is, the Enhanced Origination message is used to assign radio resources for SO 60 and establish a new traffic path between the MS and the PDSN. In step 140, the BS generates a new service instance for the VoIP service in response to the Enhanced Origination message and requests the PDSN to establish a traffic path for the VoIP service. When the PDSN notifies the BS of set up of the VoIP traffic path in step 150, the BS informs the MS that the radio resources have been assigned for SO 60 and the traffic path has been established in step 160.

In step 170, the MS and the PDSN exchange a flow mapping rule for multiple service instances, a header processing method for each flow, and full header information for HSG according to an Multi Channel Flow Treatment Protocol (MCFTP). Thus, VoIP packets are transmitted through the traffic path connected by SO 60 and the MS and the PDSN strip and generate headers for the VoIP packets in step 180.

As described above, while the CDMA2000 1x system classifies the service types of user data according to SOs and manages a plurality of service instances to handle different service types for one call connection, the CDMA2000 1xEV-DO system does not use SO. Therefore, the inventive CDMA2000 1xEV-DO system is so configured that the stream layer uses different stream headers for different service types and required information is defined beforehand in a session configuration procedure.

Figure 5:
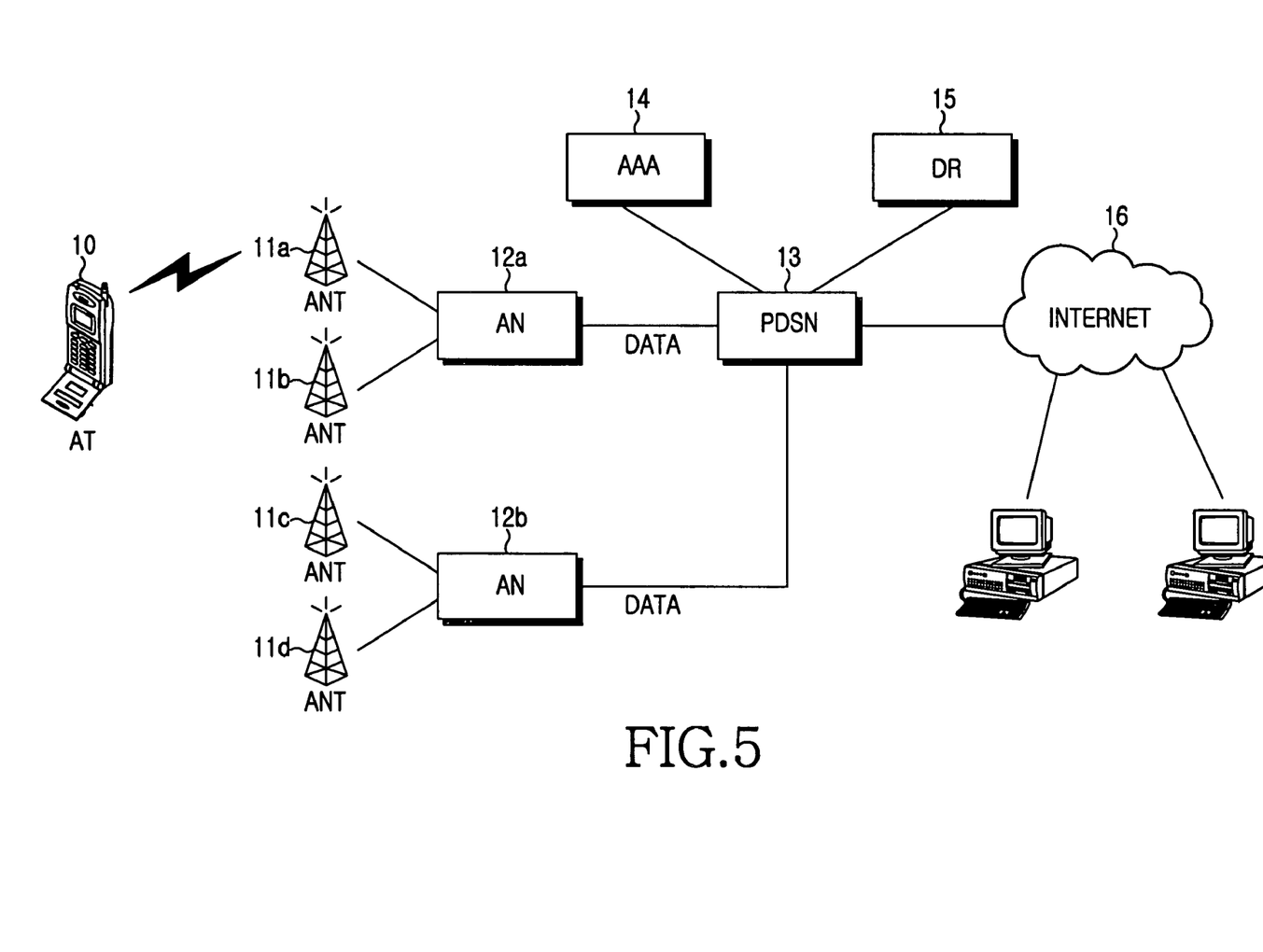
FIG. 5 is a block diagram illustrating an example of a configuration of a CDMA2000 1xEV-DO mobile telecommunication system according to an embodiment of the present invention.

FIG. 5 is a block diagram illustrating an example of a configuration of a CDMA2000 1xEV-DO mobile telecommunication system according to an embodiment of the present invention.

Referring to FIG. 5, an AT 10 communicates wirelessly with at least one of ANs 12a and 12b through at least one of antennas (ANTs) 11a to 11d. The ANs 12a and 12b are connected to other computers over the Internet 16 via a PDSN 13. The PDSN 13 provides a packet data service to the AT 10 by exchanging necessary information with an Authentication Authorization and Accounting (AAA) server 14 and a Data Register (DR) 15. Each of the ANs 12a and 12b includes a Packet Control Function (PCF) (not shown) which is type of router for connecting the AN to the PDSN 13, and an AN-AAA server (not shown) for storing the authentication information of ATs that access the AN.

While the CDMA1000 1x system transmits a VoIP packet in each frame period (e.g., 20 msec) on an FCH being a low-rate physical channel dedicated to one user, the CDMA2000 1xEV-DO system, which does not assign a dedicated channel, assigns a physical channel to one user in each period (e.g., 1.66 msec). This scheduling is performed by an RF scheduler (not shown) in each of the ATs 12a and 12b. The RF scheduler selects a user to be assigned to a physical channel in each scheduling period among ATs communicating with the AT. The RF scheduler performs scheduling based on factors required to meet the Quality of Service (QoS) of multimedia traffic, such as jitter, delay, and throughput, and overall system efficiency.

To provide a service (e.g., PPP processing in the PDSN, RLP processing and RF scheduling) according to user data characteristics in the thus-constituted CDMA2000 1xEV-DO mobile telecommunication system, service types must be distinguished by various traffic characteristics. In embodiments of the present invention, three service types are defined according to traffic QoS as follows, as in the CDMA2000 1x system.

First service type (SI-TYPE__1): retransmitting RLP (Radio Link Protocol), PPP framing, delay insensitive, error sensitive (e.g., Web, FTP, HTTP);

Second service type (SI-TYPE__2): no RLP framing, no PPP framing, delay sensitive, error insensitive (e.g., VoIP, EVRC, SMV); and Third service type (SI-TYPE__3): no retransmitting RLP, PPP framing, delay sensitive, error insensitive (e.g., video streaming, multimedia).

To allow the stream layer to identify a service type, the above service types must be defined in a session procedure. However, addition of bits to the 2-bit existing stream header to represent the three service types increases radio channel capacity. Therefore, a first session procedure is performed to initially authenticate an AT, followed by a second session procedure to support multimedia service in an embodiment of the present invention. In the second session procedure, stream types are defined to distinguish various service types.

Figure 6:
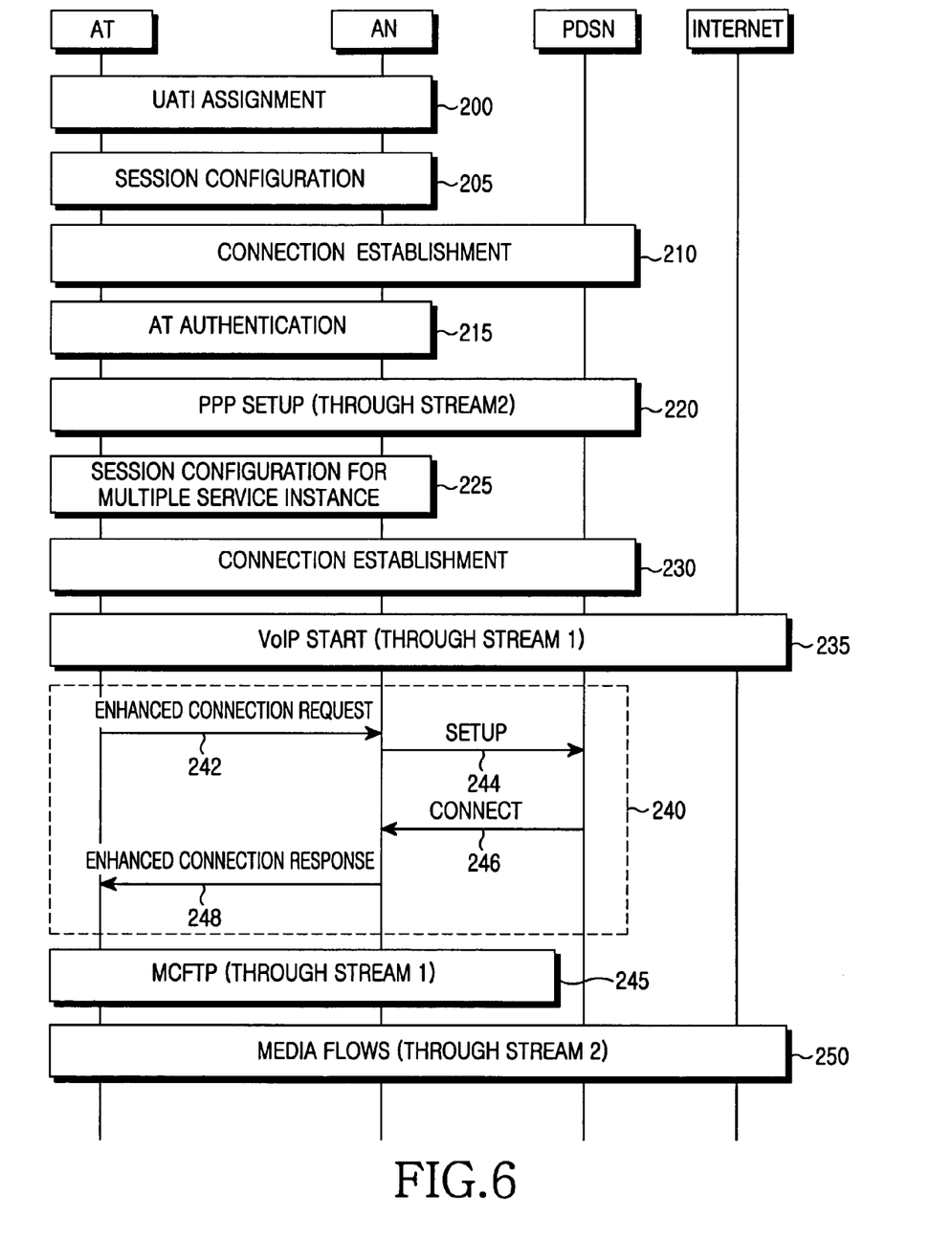
FIG. 6 is a diagram illustrating an example of a call flow to generate a service instance in a CDMA2000 1xEV-DO mobile telecommunication system supporting multiple service instances according to an embodiment of the present invention.

FIG. 6 is a diagram illustrating an example of a call flow for generating a service instance in the CDMA2000 1xEV-DO mobile telecommunication system supporting multimedia service according to an embodiment of the present invention.

Referring to FIG. 6, a Unicast Access Terminal Identifier (UATI) is assigned to an AT by an AN in step 200. The UATI is a unique ID to identify the AT over the Internet. In step 205, a session is configured for AT authentication and PPP connection. The session configuration is performed in the separate protocol layers of the CDMA2000 1xEV-DO system, as illustrated in FIG. 1. Specifically, the stream layer configures a session as follows.

Figure 7:
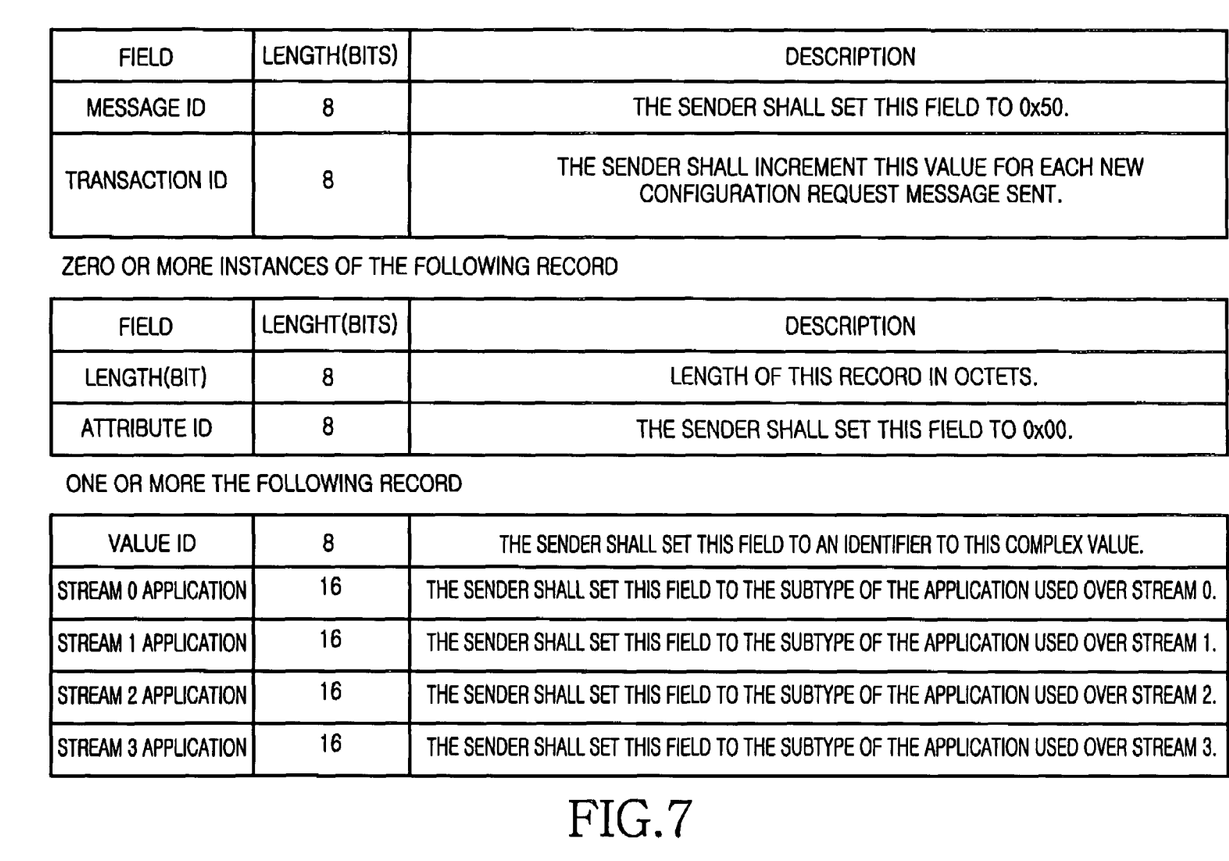
FIG. 7 is a diagram illustrating an example of the format of a Configuration Request message according to an embodiment of the present invention.
Figure 8:
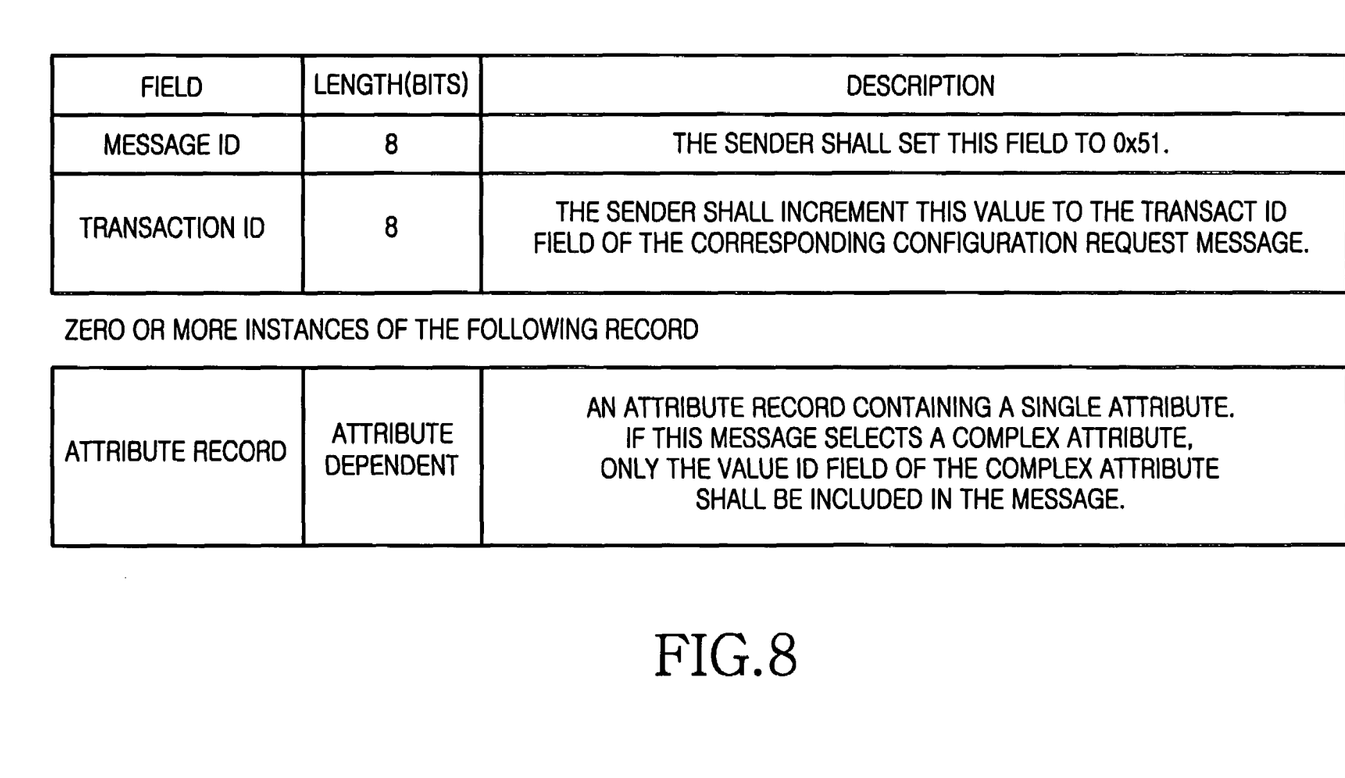
FIG. 8 is a diagram illustrating an example of the format of a Configuration Response message according to an embodiment of the present invention.

The stream layer-session configuration is done by exchanging a Configuration Request message and a Configuration Response message between the stream layers of the AT and the AN. The session configuration is initiated by the AT or AN. The formats of those messages are illustrated respectively in FIGS. 7 and 8. Referring to FIG. 7, the Configuration Request message includes 8-bit Message ID and 8-bits Transaction ID, which are mandatory. It further includes optional fields to indicate stream types. Referring to FIG. 8, the Configuration Response message also includes the mandatory Message ID and Transaction ID fields.

The session configuration message includes 16-bit stream application subtype records to represent stream types by stream headers. That is, since the stream layer forms a stream header according to the type of data processed in the application layer, the subtype records are set to stream types represented by stream headers. For step 205 of AT authentication and PPP connection, the stream types are defined as described before with reference to FIG. 2.

Stream 0: signaling (ID=0x0000)
Stream 1: PPP packet for authentication (ID=0x0001)
Stream 2: PPP packet bound to the PDSN (ID=0x0002)
Stream 3: TAS (ID=0x0003)

In step 210, the AN initially establishes a traffic channel with the AT by assigning radio resources. Thus a traffic path is established between the AT and the PDSN via the AN. More specifically, the AT in an idle state generates a service instance and transmits a Connection Request message for CDMA2000 1xEV-DO to the AN. The AN then generates a corresponding service instance, establishes the traffic path with the PDSN, and notifies the AT that the traffic path has been normally established. Data delivered in the traffic path is one of the stream types defined in step 205.

The AN authenticates the AT over stream 1 among the defined stream types in step 215, and the PDSN authenticates the AT over stream 2 and establishes a PPP connection in step 220.

Upon PPP connection, the AN can exchange PPP packets with the PDSN. To enable the PDSN to identify packet data of various service types, the second session must be configured which supports the multimedia service. The second session configuration enables a voice call service by VoIP and a multimedia moving picture service.

Figure 9:
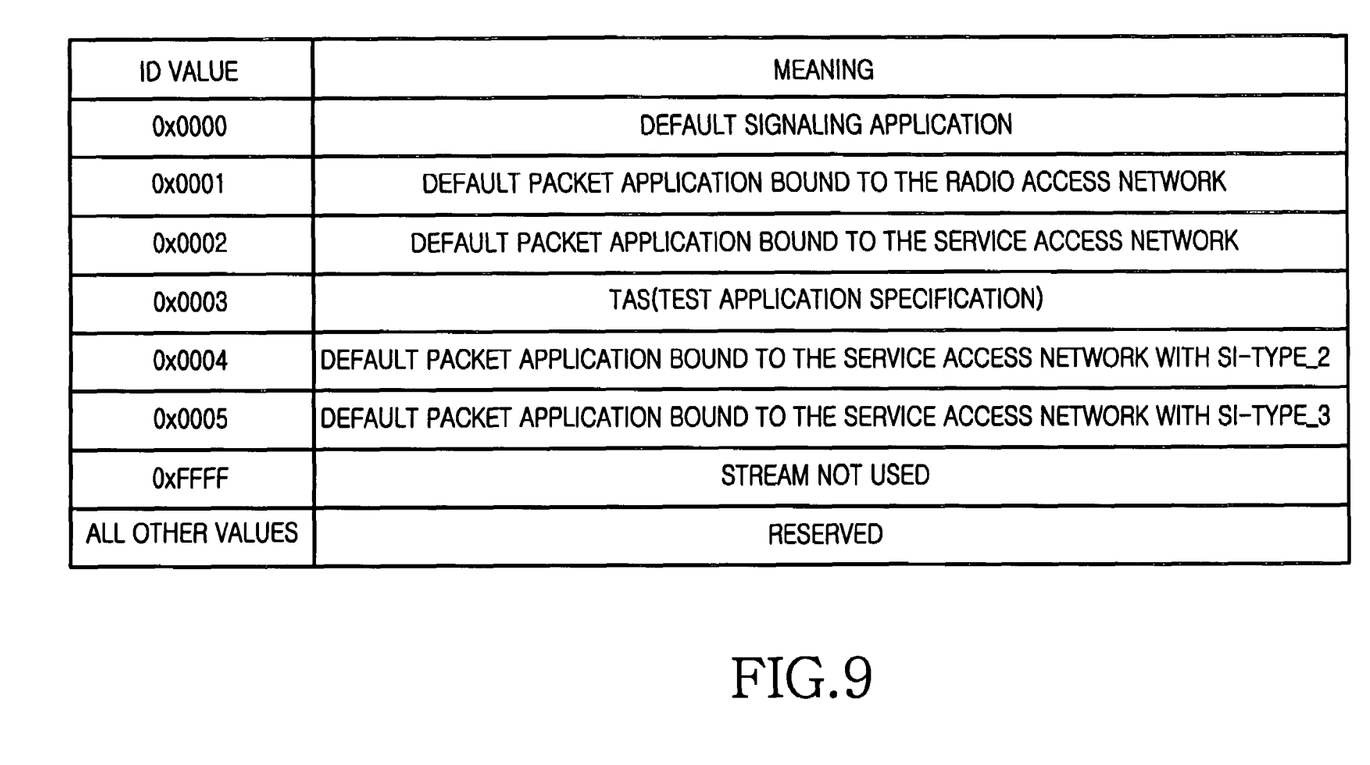
FIG. 9 is a diagram illustrating an example of type records for a session configuration message according to an embodiment of the present invention.

In step 225, the AT performs the second session configuration to support multiple services. Type records for a session configuration message that sets these service types are illustrated in FIG. 9. In a comparison between FIG. 2 and FIG. 9, values indicating SI-TYPE__2 and SI-TYPE__3 are additionally defined.

Stream 0: signaling (ID=0x0000)
Stream 1: SI-TYPE__1 (ID=0x0002)
Stream 2: SI-TYPE__2 (ID=0x0004)
Stream 3: SI-TYPE__3 (ID=0x0005)

'0x0002' indicating the conventional stream 1 is used to indicate SI-TYPE_1, and '0x0004' and '0x0005' are newly defined to indicate streams 2 and 3, respectively. If TAS is used to check a system function, step 205 must be repeated to adopt the type records illustrated in FIG. 2.

To apply the second session configuration, the AT releases the traffic path established in step 210 and establishes a new traffic path with the PDSN in step 230. More specifically, the AT in an idle state generates a service instance and transmits a Connection Request message to the AT. The AT then generates a corresponding service instance, establishes a traffic path with the PDSN, and notifies the AT of the normal traffic path setup. Here, the Connection Request message is a signaling message having a Stream Type field set to stream 0.

In step 235, the VoIP service or video multimedia service is initiated according to an E2E Session Initialization Protocol (SIP) though stream 1 set by the session configuration in step 225. If a user clicks an icon corresponding to the VoIP service or video multimedia service during web browsing through stream 1, the AT performs a signaling procedure with a corresponding server by the E2E SIP. The AT generates a service instance for the VoIP or video multimedia service in addition to an existing service for the web browsing.

The AT establishes the new traffic path with the PDSN in a connected state in step 240.

Figure 10:
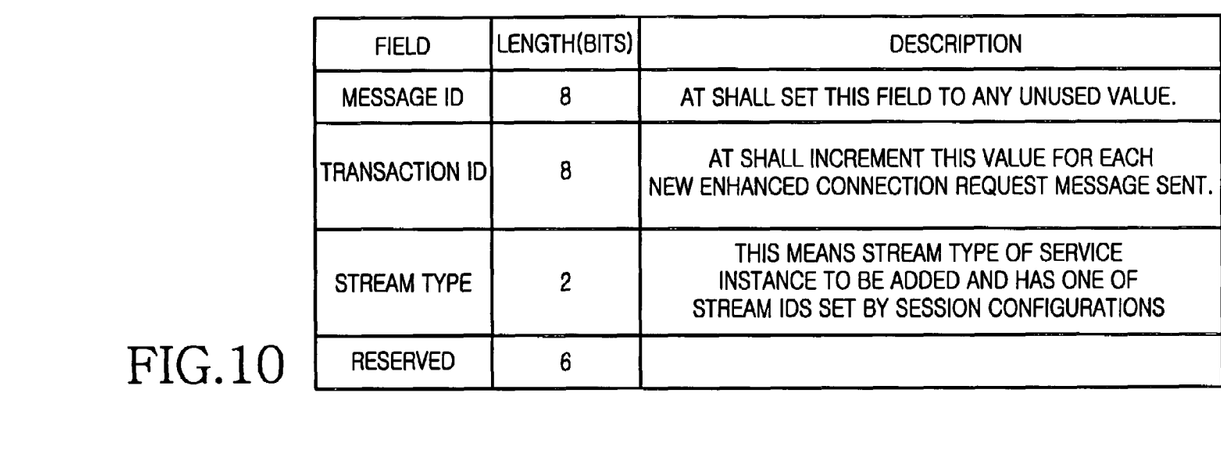
FIG. 10 is a diagram illustrating an example of the format of a Connection Request message according to an embodiment of the present invention.

Specifically in step 240, the AT additionally generates a service instance for the initiated service and transmits an Enhanced Connection Request message to the AN in step 242. The Enhanced Connection Request message evolves from the Connection Request message which can be transmitted only in the idle state. As illustrated in FIG. 10, the Enhanced Connection Request message is comprised of 8-bit Message ID, 8-bit Transaction ID, and 2-bit Stream Type indicating the stream type of the service instance. The Stream Type field is set to one of the values defined in step 225. If the VoIP service is initiated, Stream Type is set to indicate stream 2. If the video multimedia service is initiated, Stream Type is set to indicate stream 3.

Figure 11:
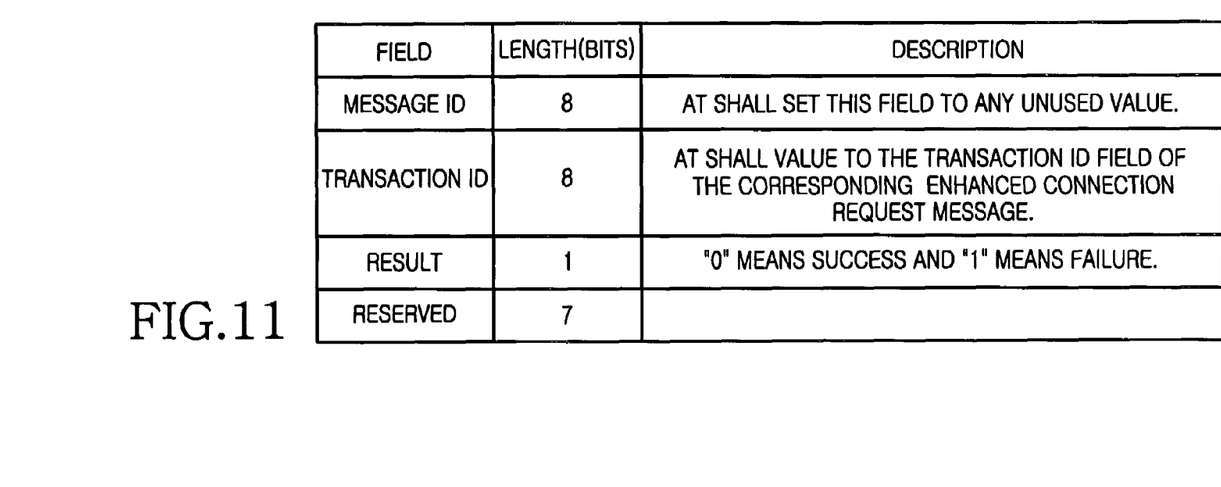
FIG. 11 is a diagram illustrating an example of the format of an Enhanced Connection Request message according to an embodiment of the present invention.

The AN generates a service instance to process the stream type in response to the Enhanced Connection Request message and requests the PDSN to establish a new traffic path in step 244. If the PDSN notifies the AN of the traffic path setup in step 246, the AN notifies the AT of the completed traffic path connection by an Enhanced Connection Response message. As illustrated in FIG. 11, the Enhanced Connection Response message includes 1-bit Result indicating connection success or failure in addition to 8-bit Message ID and 8-bit Transaction ID.

In step 245, the AT and the PDSN exchange a flow mapping rule for the service instances generates in steps 230 and 240, a header processing method for each flow, and full header information for HSG according to an MCFTP using stream 1. Thus, data streams are delivered according to the service instances in step 260. For example, a web browsing packet is delivered in a traffic path corresponding to a service instance for stream 1, and a VoIP or IP multimedia packet, in a traffic path corresponding to a service instance for stream 2 or stream 3.

The service instances describe the traffic characteristics of their corresponding data packets. Required traffic characteristics and functions for the service types are as follows.

1. SI-TYPE_1 through stream 1
   Insensitive to delay, but sensitive to errors
   Normal PPP framing
   RLP framing and retransmission by normal RLP operation
   Scheduling for best effort service in CDMA2000 1xEV-DO RF scheduler
2. SI-TYPE_2 through stream 2
   Sensitive to delay, but insensitive to errors
   HSG
   No RFL framing and retransmission by null RLP
   Scheduling for VoIP packets to provide voice service
3. SI-TYPE_3 through stream 3
   Sensitive to delay, but insensitive to errors
   Normal PPP framing
   Only RFL framing, not retransmission by transparent RLP
   Scheduling according to multimedia traffic characteristics.

Figure 12:
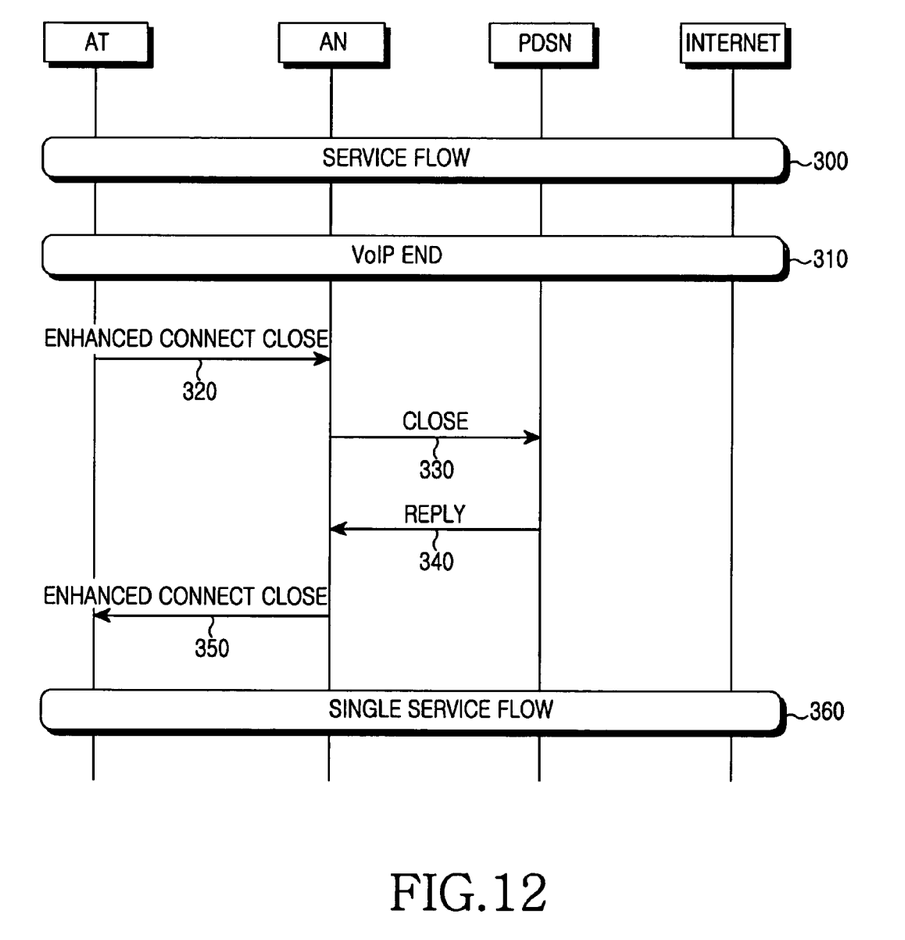
FIG. 12 is a diagram illustrating an example of a call flow to terminate a service instance in the CDMA2000 1xEV-DO mobile telecommunication system supporting multiple service instances according to an embodiment of the present invention.
Figure 13:
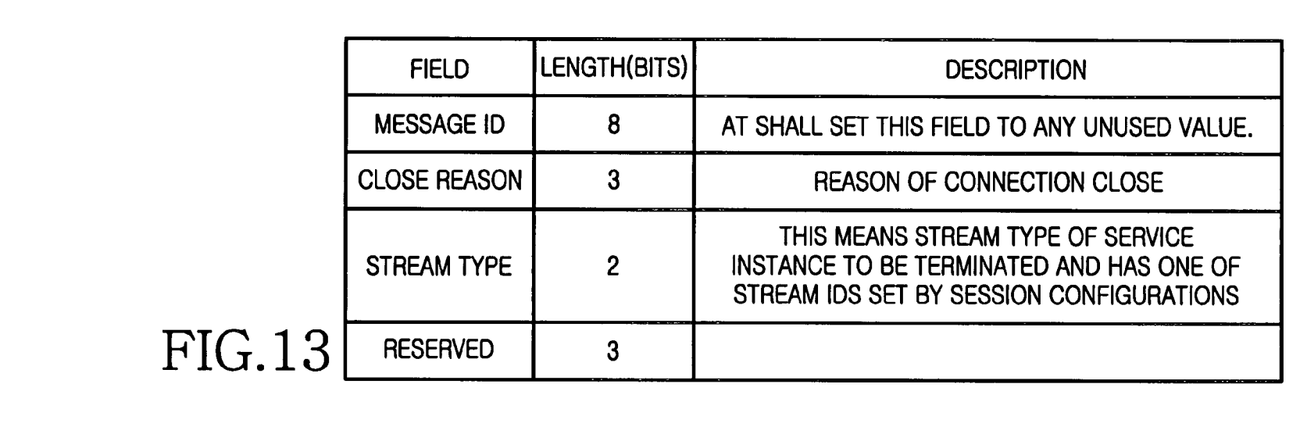
FIG. 13 is a diagram illustrating an example of the format of an Enhanced Connection Close message according to an embodiment of the present invention.

FIG. 12 is a diagram illustrating an example of a call flow for terminating a service instance in the CDMA2000 1xEV-DO mobile telecommunication system supporting multimedia service according to an embodiment of the present invention.

Referring to FIG. 12, the multimedia service with various traffic characteristics proceeds for the AT according to the service instances generated in the procedure of FIG. 6 in step 300. If one of the service instances is to be terminated, an E2E SIP signaling procedure corresponding to the service instance is performed between the AT and a corresponding Internet server in step 310. For example, if the AT intends to terminate the VoIP service, it exchanges SIP signaling messages with a VoIP server.

Figure 14:
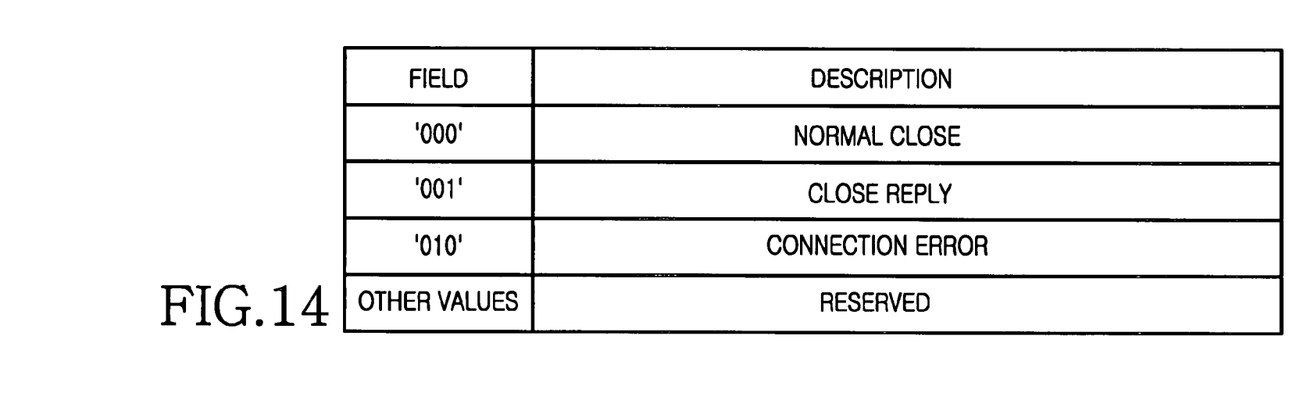
FIG. 14 is a diagram illustrating an example of values specified for a Close Reason field according to an embodiment of the present invention.

In step 320, the AT transmits to the AN an Enhanced Connection Close message related to the Enhanced Connection Request message and the Enhanced Connection Response message. The Enhanced Connection Close message has 8-bit Message ID, 3-bit Close Reason, and 2-bit Stream Type. Values defined for the Close Reason field are listed in FIG. 14. Referring to FIG. 14, '000' indicates normal close, '001' indicates close reply, and '010' indicates connection error. The Stream Type field indicates the stream type of the service instance to be terminated.

The AN requests the PDSN to release a traffic path corresponding to the service instance to be terminated in step 330. When the PDSN notifies the AN of the traffic path release in step 340, the AN informs the AT that the traffic path has been released successfully by an Enhanced Connection Close Response message in step 350. This Enhanced Connection Close Response message is of the same structure as the Enhanced Connection Close message, and has Close Reason set to 0001 to indicate close reply. The AT terminates the service instance in response to the Enhanced Connection Close Response message.

When transmitting the Enhanced Connection Close message, or a predetermined time after the transmission, the AT terminates the service instance in an embodiment of the present invention. It can be further contemplated as another embodiment that the AN does not transmit the Enhanced Connection Close Response message.

In accordance with the present invention as described above, a plurality of service instances are generated and terminated according to traffic characteristics by one PPP connection. The resulting provisioning of transmission services based on user data characteristics (e.g., PPP processing in the PDSN, RLP processing and RF scheduling) increases system efficiency and user satisfaction and enables data service-based voice calls in a data only mobile telecommunication system.

While the invention has been shown and described with reference to a certain embodiments thereof, it will be understood by those skilled in the art that various changes in form and details may be made therein without departing from the spirit and scope of the invention as defined by the appended claims.

What is claimed is:

1. A method of receiving multiple services according to a plurality of service types in an access terminal (AT) in a data only mobile telecommunication system having an access network (AN) for communicating with the AT on a radio channel and a packet data service node (PDSN) for providing a data service to the AT via the AN, the method comprising the steps of:
   (1) establishing a connection for the data service with the PDSN and configuring a session for defining stream types and setting different stream headers to distinguish the plurality of service types having different traffic characteristics by the connection;
   (2) generating a plurality of service instances for the different service types according to the session configuration; and
   (3) exchanging data streams with the PDSN in a service instance corresponding to a currently provided service among the plurality of service instances.

2. The method of claim 1, wherein in the step (1), data streams that can be processed according to the session configuration are classified into a stream type for signaling, and a plurality of stream types for the plurality of service types.

3. The method of claim 2, wherein the plurality of stream types are a stream type for a conventional data service, a stream type for a voice call service, and a stream type for a video multimedia service.

4. The method of claim 1, wherein the step (2) comprises the steps of:
   being assigned to a traffic channel in an idle state by the AN, generating a first service instance, and establishing a first traffic path for the first service instance with the PDSN; and
   generating a second service instance corresponding to the service type of a new service upon request for the new service according to the first service instance, and establishing a second traffic path for the second service instance with the PDSN.

5. The method of claim 4, wherein the second service instance generating step comprises the steps of:
   transmitting to the PDSN via the AN a connection request message with the service type of the second service instance set; and
   receiving a connection response message from the PDSN via the AN in response to the connection request message.

6. The method of claim 5, wherein the connection request message is transmitted in a connected state where a traffic channel has already been established.

7. The method of claim 1, further comprising the step of selecting one of the plurality of service instances generated according to the session configuration and terminating the selected service instance.

8. The method of claim 7, wherein the step of selecting and terminating the service instance comprises the steps of:
   transmitting to the PDSN via the AN a connection close message with the service type of a service instance to be terminated; and
   receiving a connection close response message from the PDSN via the AN in response to the connection close message and terminating the service instance.

9. A method of providing multiple services according to a plurality of service types in a data only mobile telecommunication system having an access network (AN) for communicating with an access terminal (AT) on a radio channel and a packet data service node (PDSN) for providing a data service to the AT via the AN, the method comprising the steps of:
   (1) configuring a first session for AT authentication between the AT and the AN, authenticating the AT according to the first session, and establishing a connection for the data service between the AT and the PDSN;
   (2) configuring a second session by the connection, for defining stream types and setting different stream headers to distinguish a plurality of service types having different traffic characteristics;
   (3) generating the plurality of service instances set to different service types according to the second session; and
   (4) exchanging data streams between the AT and the PDSN in a service instance corresponding to a currently provided service among the plurality of service instances.

10. The method of claim 9, wherein in the step (2), data streams that can be processed according to the second session are classified into a stream type for a typical data service, a stream type for a voice call service, and a stream type for a video multimedia service.

11. The method of claim 9, wherein the step (3) comprises the steps of:
   assigning a traffic channel to the AT in an idle state by the AN, generating a first service instance, and establishing a first traffic path for the first service instance between the AT and the PDSN; and
   generating a second service instance corresponding to the service type of a new service upon request for the new service according to the first service instance, and establishing a second traffic path for the second service instance between the AT and the PDSN.

12. The method of claim 11, wherein the second service instance generating step comprises the steps of:
   transmitting from the AT to the PDSN via the AN a connection request message with the service type of the second service instance set; and
   receiving a connection response message in response to the connection request message from the PDSN via the AN in the AT.

13. The method of claim 12, wherein the connection request message is transmitted in a connected state where a traffic channel has already been established.

14. A method of providing multiple services according to a plurality of service types in a data only mobile telecommunication system having an access network (AN) for communicating with an access terminal (AT) on a radio channel and a packet data service node (PDSN) for providing a data service to the AT via the AN, the method comprising the steps of:
   transmitting stream type data between the AT and the PDSN in traffic paths established for a plurality of service instances set to a plurality of service types, which are distinguished by different stream headers, by a connection for the data service;
   transmitting from the AT to the PDSN via the AN a connection close message with the service type of a service instance to be terminated, upon request for termination of the service instance; and terminating the service instance in the AT upon receipt of a connection close response message from the PDSN via the AN.

15. A system for receiving multiple services, according to a plurality of service types in an access terminal (AT) in a data only mobile telecommunication system, the system comprising:
an access network (AN) for communicating with the AT on a radio channel and a packet data service node (PDSN) for providing a data service to the AT via the AN;
said AN being adapted to
establish a connection for the data service with the PDSN and configure a session for defining stream types and setting different stream headers to distinguish the plurality of service types having different traffic characteristics by the connection;
generate a plurality of service instances for the different service types according to the session configuration; and
exchange data streams with the PDSN in a service instance corresponding to a currently provided service among the plurality of service instances.

16. The system of claim 15, wherein the data streams that can be processed according to the session configuration are classified into a stream type for signaling, and a plurality of stream types for the plurality of service types.

17. The system of claim 16, wherein the plurality of stream types are a stream type for a conventional data service, a stream type for a voice call service, and a stream type for a video multimedia service.

18. The system of claim 15, wherein the AN is further adapted to assign the plurality of service instances for the different service types according to the session configuration to a traffic channel in an idle state, generate a first service instance, and establish a first traffic path for the first service instance with the PDSN; and
generate a second service instance corresponding to the service type of a new service upon request for the new service according to the first service instance, and establish a second traffic path for the second service instance with the PDSN.

19. The system of claim 18, wherein the AN is further adapted to transmit to the PDSN a connection request message with the service type of the second service instance set; and receive a connection response message from the PDSN in response to the connection request message.

20. The system of claim 19, wherein the connection request message is transmitted in a connected state where a traffic channel has already been established.

21. The system of claim 15, wherein the AN is further adapted to select one of the plurality of service instances generated according to the session configuration and terminate the selected service instance.

22. The system of claim 21, wherein the AN is further adapted to transmit to the PDSN a connection close message with the service type of a service instance to be terminated; and receive a connection close response message from the PDSN in response to the connection close message and terminate the service instance.

23. A system for providing multiple services according to a plurality of service types in a data only mobile telecommunication system, the system comprising:
an access network (AN) for communicating with an access terminal (AT) on a radio channel and a packet data service node (PDSN) for providing a data service to the AT via the AN;
said AN being adapted to
configure a first session for AT authentication between the AT and the AN, authenticate the AT according to the first session, and establish a connection for the data service between the AT and the PDSN;
configure a second session by the connection, for defining stream types and setting different stream headers to distinguish a plurality of service types having different traffic characteristics;
generate the plurality of service instances set to different service types according to the second session; and
exchange data streams between the AT and the PDSN in a service instance corresponding to a currently provided service among the plurality of service instances.

24. The system of claim 23, wherein data streams that can be processed according to the second session are classified into a stream type for a conventional data service, a stream type for a voice call service, and a stream type for a video multimedia service.

25. The system of claim 23, the AN is further adapted to assign a traffic channel to the AT in an idle state, generate a first service instance, and establish a first traffic path for the first service instance between the AT and the PDSN; and
generate a second service instance corresponding to the service type of a new service upon request for the new service according to the first service instance, and establish a second traffic path for the second service instance between the AT and the PDSN.

26. The system of claim 25, wherein the AN is further adapted to transmit from the AT to the PDSN a connection request message with the service type of the second service instance set; and receive a connection response message in response to the connection request message from the PDSN in the AT.

27. The system of claim 26, wherein the connection request message is transmitted in a connected state where a traffic channel has already been established.

28. A system for providing multiple services according to a plurality of service types in a data only mobile telecommunication system, the system comprising:
an access network (AN) for communicating with an access terminal (AT) on a radio channel and a packet data service node (PDSN) for providing a data service to the AT via the AN;
said AN being adapted to
transmit stream type data between the AT and the PDSN in traffic paths established for a plurality of service instances set to a plurality of service types, which are distinguished by different stream headers, by a connection for the data service;
transmit from the AT to the PDSN a connection close message with the service type of a service instance to be terminated, upon request for termination of the service instance; and
terminate the service instance in the AT upon receipt of a connection close response message from the PDSN.

* * * * *